(12) United States Patent
Karlsson et al.

(10) Patent No.: US 10,841,108 B2
(45) Date of Patent: Nov. 17, 2020

(54) PROVISION OF LOCATION INFORMATION IN AN IP MULTIMEDIA SUBSYSTEM NETWORK

(71) Applicant: Telefonaktiebolaget LM Ericsson (publ), Stockholm (SE)

(72) Inventors: Ove Karlsson, Emmaboda (SE); Jan Dahl, Älvsjö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 3 days.

(21) Appl. No.: 15/551,529

(22) PCT Filed: Feb. 17, 2015

(86) PCT No.: PCT/SE2015/050180
§ 371 (c)(1),
(2) Date: Aug. 16, 2017

(87) PCT Pub. No.: WO2016/133433
PCT Pub. Date: Aug. 25, 2016

(65) Prior Publication Data
US 2018/0041350 A1  Feb. 8, 2018

(51) Int. Cl.
*H04L 12/14*  (2006.01)
*H04W 4/029*  (2018.01)
(Continued)

(52) U.S. Cl.
CPC ...... *H04L 12/1403* (2013.01); *H04L 12/1425* (2013.01); *H04L 65/1006* (2013.01);
(Continued)

(58) Field of Classification Search
None
See application file for complete search history.

(56) References Cited

U.S. PATENT DOCUMENTS

2005/0114355 A1  5/2005  Nuttila
2006/0168303 A1*  7/2006  Oyama ................. H04L 67/322
709/231

(Continued)

FOREIGN PATENT DOCUMENTS

CN  102647700 A  8/2012
WO  WO-0247371 A2 *  6/2002  ............ H04M 15/00
(Continued)

OTHER PUBLICATIONS

Rosenberg et al., RFC 3261, SIP: Session Initiation Protocol, Jun. 2002, 269 pages.

(Continued)

*Primary Examiner* — Younes Naji
(74) *Attorney, Agent, or Firm* — Rothwell, Figg, Ernst & Manbeck, P.C.

(57) ABSTRACT

A method of providing location-related charging information to a charging system associated with an IP Multimedia Subsystem, IMS, network, where the location-related charging information relates to a session or session initiation or an event involving at least two users. The method comprises, at a Charging Trigger Function, CTF, within the IMS network, receiving a Session Initiation Protocol, SIP, message from each of said users, each message containing a SIP header identifying a location of the sending user. Location information of each user is added to a charging message sent from the CTF to said charging system, location information being, or being derived from, the content of the SIP header received from the user or being derived from that SIP header.

20 Claims, 8 Drawing Sheets

(51) Int. Cl.
  *H04L 29/06* (2006.01)
  *H04L 29/08* (2006.01)
  *H04M 15/00* (2006.01)
(52) U.S. Cl.
  CPC ...... *H04L 65/1016* (2013.01); *H04L 65/1063* (2013.01); *H04L 67/18* (2013.01); *H04L 67/22* (2013.01); *H04L 69/22* (2013.01); *H04M 15/57* (2013.01); *H04M 15/67* (2013.01); *H04M 15/8033* (2013.01); *H04W 4/029* (2018.02)

(56) References Cited

U.S. PATENT DOCUMENTS

| | | | |
|---|---|---|---|
| 2010/0041365 A1* | 2/2010 | Lott | H04M 15/68 455/406 |
| 2010/0248685 A1* | 9/2010 | Li | H04L 12/14 455/406 |
| 2010/0257582 A1* | 10/2010 | Castellanos Zamora | H04L 63/108 726/1 |
| 2013/0322344 A1* | 12/2013 | Li | H04M 15/63 370/328 |
| 2014/0068710 A1* | 3/2014 | Lau | H04L 12/66 726/3 |
| 2016/0196494 A1* | 7/2016 | Scarr | G06N 5/048 706/58 |

FOREIGN PATENT DOCUMENTS

| | | |
|---|---|---|
| WO | 2010051829 A1 | 5/2010 |
| WO | 2011060815 A1 | 5/2011 |

OTHER PUBLICATIONS

3GPP TS 24.229 V12.6.0, "3rd Generation Partnership Project; Technical Specification Group Core Network and Terminals; IP multimedia call control protocol based on Session Initiation Protocol (SIP) and Session Description Protocol (SDP); Stage 3 (Release 12)," Sep. 2014, 844 pages.

3GPP TS 32.240 V12.5.0, "3rd Generation Partnership Project; Technical Specification Group Services and System Aspects; Telecommunication management; Charging management; Charging architecture and principles (Release 12)," Sep. 2014, 52 pages.

3GPP TS 32.260 V12.5.0, "3rd Generation Partnership Project; Technical Specification Group Services and System Aspects; Telecommunication management; Charging management; IP Multimedia Subsystem (IMS) charging (Release 12)," Sep. 2014, 180 pages.

3GPP TS 32.299 V12.6.0, "3rd Generation Partnership Project; Technical Specification Group Services and System Aspects; Telecommunication management; Charging management; Diameter charging applications (Release 12)," Sep. 2014, 164 pages.

International Search Report and Written Opinion issued in International Application No. PCT/SE2015/050180, dated Oct. 29, 2015, 12 pages.

York, D. and Asveren, T., "P-Charge-Info—A Private Header (P-Header) Extension to the Session Initiation Protocol (SIP); draft-york-dispatch-p-charge-info-04" Internet Engineering Task Force, IETF; Standardworkingdraft, Internet Society (ISOC), 4, Oct. 24, 2014, pp. 1-17.

Tsai, J. et al., "The technique of IMS Sh interface and its NGN LBS application", Communication Technology (ICCT), 2010 12th IEEE International Conference, Nov. 11, 2010, pp. 599-602.

First Chinese Office Action issued in corresponding Chinese Application No. 201580076395.6, dated Feb. 6, 2020, 4 pages.

* cited by examiner

PROVISION OF LOCATION INFORMATION IN AN IP MULTIMEDIA SUBSYSTEM NETWORK

CROSS REFERENCE TO RELATED APPLICATION(S)

This application is a 35 U.S.C. § 371 National Stage of International Patent Application No. PCT/SE2015/050180, filed Feb. 17, 2015, designating the United States, the disclosure of which is incorporated by reference.

TECHNICAL FIELD

The present invention relates to the provision of location information in an IP Multimedia Subsystem (IMS) network, and more particularly to the provision of such information for the purpose of handling session or event charging.

BACKGROUND

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The IP Multimedia Subsystem (IMS) is an access independent architectural framework for supporting traditional telephony as well as the new IP multimedia services (Release 11: 3GPP TS 22.228 V12.9.0; 23.228 V12.7.0; 24.229 V12.7.0; 29.228 V12.4.0; 29.229 V12.4.0; 29.328 V12.7.0; 29.329 V12.5.0). IMS provides key features to enrich the end-user person-to-person communication experience through the use of standardized IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet.

The IMS makes use of the Session Initiation Protocol (SIP), as specified in IETF RFC 3261, to set up and control calls or sessions between user terminals (or terminals and application servers). The Session Description Protocol (SDP), carried by SIP signaling, is used to describe and negotiate the media components of the session. Whilst SIP was created as a user-to-user protocol, IMS allows operators and service providers to control user access to services and to charge users accordingly. The 3GPP has chosen SIP for signaling between a User Equipment (UE) and the IMS as well as between the components within the IMS.

By way of example, FIG. 1 illustrates schematically how the IMS fits into the mobile network architecture in the case of a LTE access network (IMS can of course operate over other access networks including, for example, UMTS packet switched and circuit switched access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF (or from an external network).

Within the IMS service network, Application Servers (ASs) are provided for implementing IMS service functionality. Application Servers provide services to end users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from a Home Subscriber Server (HSS) during the IMS registration procedure as part of a user's Subscriber Profile. Examples of ASs are a Telephony AS (TAS) that is responsible for setting up voice calls between users and a voice mail AS that allows users to access voice mail services.

3GPP TS 32.260 defines the Offline and Online Charging description for the IP Multimedia Subsystem. For both Offline and Online charging, charging information for network resource usage is collected concurrently with that resource usage. In Offline charging this charging information does not affect, in real-time, the service rendered. However, in Online charging, authorization for the network resource usage must be obtained by the network prior to the actual resource usage.

FIG. 2 illustrates schematically the IMS offline charging architecture. In this architecture a Charging Trigger Function (CTF) generates offline charging events based on the observation of network resource usage. All IMS entities handling SIP signalling can be provided with CTF functionality (the entities implementing the CTF shown in FIG. 2 are merely exemplary, and other nodes may also implement the CTF). The CTF is the focal point for collecting the information pertaining to chargeable events within the network element, assembling this information into matching charging events, and sending these charging events towards the Charging Data Function (CDF), for example using the Diameter protocol. The Charging Data Function (CDF) receives charging events from the CTFs via the Rf reference point. It then uses the information contained in the charging events to construct Charging Data Records (CDRs). The CDRs produced by the CDF are transferred to the Charging Gateway Function (CGF) via the Ga reference point. The CGF acts as a gateway between the 3GPP network and the network operator's Billing Domain (BD), and uses the Bx reference point for the transfer of CDR files to the BD. The BD typically comprises post-processing systems such as the operator's billing system or billing mediation device. The Charging Gateway Function's (CGF) main functionalities are in principle equivalent to those of the Charging Collection Function's (CCF) for IMS.

FIG. 3 illustrates schematically the IMS online charging architecture. In this architecture, when receiving a network resource usage request, a CTF assembles the relevant charging information (which is not necessarily identical to the charging information employed in offline charging) and generates an online charging event that is transferred to the Online Charging Function (OCF) within the Online Charging System (OCS) in real-time using the Ro reference point, again using, for example, Diameter. The OCF then returns an appropriate resource usage authorization based, for example, on subscriber account information. This resource usage authorization may be limited in its scope (e.g. volume of data or duration), and may therefore have to be renewed from time to time as long as the subscriber's network resource usage persists. If required by the operator, CDRs may additionally be generated for online charged subscribers. The OCF includes the Session Based Charging Function (SBCF/SCF) and the Event Based Charging Function (EBCF/ECF). The SBCF is responsible for online charging of network/user sessions, e.g. voice calls, IP CAN bearers, IP CAN session or IMS sessions. The EBCF performs event-based online charging (often referred to as "content charging") in conjunction with any application server or service NE, including SIP application servers.

As illustrated in FIG. 3, only an AS (e.g. a Telephony Application Server, TAS), an MRFC or an S-CSCF support online charging. However, with regards to the S-CSCF, the S-CSCF does not trigger any online charging events. A special CTF is therefore needed in order to mediate between the Ro based SBCF and the SIP based service control implemented by the S-CSCF. This role is taken by the IMS Gateway Function (IMS-GWF), which translates between SIP service control towards the S-CSCF and Ro credit control on the OCS side. From the perspective of the online charging architecture, the IMS-GWF is an online charging capable CTF; whilst from the perspective of the S-CSCF the IMS-GWF is a SIP application server and is triggered in the same way. As such, the S-CSCF supports online charging using either the ISC interface (i.e. if the application server addressed over the ISC interface is IMS-GWF), or the Ro interface directly (if the IMS-GWF is integrated within the S-CSCF).

Generation of Diameter charging messages in a CTF is in most cases triggered by the receipt of a certain SIP message (request or response). The same SIP message may trigger charging in all CTFs through which it passes. The CTF indicates to the CDF/OCF whether to start, update or terminate a charging session based on the SIP message it receives (or may indicate some other charging event). The SIP messages carry information related to the service as well as to the user originating and terminating the SIP message. The charging messages forward this information to the CDF/OCF to enable correct rating and charging decisions.

The tariff (rate) for a given service applied by a network operator, e.g. a telephony service, may depend on the location of the user served by that network operator. For example, a lower rate may be applied when the user is located within the operator's home network with a higher rate being applied when the user is roaming in a visited network. Location information for the served user is transferred over SIP as a P-Access-Network-Information (PANI) header and reported over Diameter using the Access-Network-Information AVP. The PANI header in a SIP request reflects the location of the user sending the request, i.e. a SIP response carries the location of the user sending the response. The location information of a user can be changed during an ongoing SIP dialog.

As well as depending on the location of the served user, the tariff applied by a network operator may depend upon the location of the remote or peer user. In order to provide this information to the CDF (offline charging) or OCF (online charging), non-SIP solutions have been discussed wherein a look-up of location data is performed towards a database that is regularly updated with location data. A hypothetical example with such an external look-up from OCS as applied within the context of SIP/IMS is shown in FIG. 4. In this example, the User Equipment A (UeA) represents a user originating a session and which is served by a home IMS network responsible for charging UeA for the session, UeB represents a remote user served by a different IMS network, and DB represents a database holding location information.

The database look-up solution illustrated in FIG. 4 is disadvantageous as it adds signaling load and latency to the session set up phase.

It is noted here that whilst the term "user" has been used above to refer to a User Equipment (UE), i.e. a served user or "subscriber", the term also encompasses network nodes that may provide an endpoint for an IMS session or event. For example, an IMS session may be created between a UE and a voice mail server within the IMS network.

SUMMARY

It is an object of the present invention to provide a means for efficiently providing location information for both or all users involved in an IMS enabled session of event, to a charging system entity such as an OCF or a CDF.

According to a first aspect of the present invention there is provided a method of providing location-related charging information to a charging system associated with an IP Multimedia Subsystem, IMS, network, where the location-related charging information relates to a session or session initiation or an event involving at least two users. The method comprises, at a Charging Trigger Function, CTF, within the IMS network, receiving a Session Initiation Protocol, SIP, message from each of said users, each message containing a SIP header identifying a location of the sending user. Location information of each user is added to a charging message sent from the CTF to said charging system, location information being, or being derived from, the content of the SIP header received from the user or being derived from that SIP header.

According to an embodiment of the invention, the SIP header is P-Access-Network-Info, PANI, header.

A first of said users may be a user served by the IMS network with a second of said users being a remote user served by a further IMS network. In this case, the charging message may be sent in accordance with the Diameter protocol, the location of the served user being included within an Access-Network-Information (ANI) Attribute-Value-Pair (AVP) of the charging message, and the location of the remote user being included within a further AVP of the charging message. Alternatively, least one of said users may be a network node.

The charging message may include, for each location, an identity of the associated user, wherein each identity is a SIP-Uniform Resource Identifier, SIP-URI or a Tel-Uniform Resource Identifier, Tel-URI.

Where said charging system is an offline charging system, said charging message may be sent from the CTF to a Charging Data Function, CDF, of the offline charging system, via an Rf interface. Where said charging system is an online charging system, said charging message may be sent from the CTF to an Online Charging Function, OCF, of the online charging system, via an Ro interface.

A location may be derived from a SIP header, a step of deriving comprising performing a lookup to map a content of the header to a geographical zone, in which case said lookup is performed using a database co-located with the CTF or remotely accessed by the CTF.

According to a second aspect of the present invention there is provided apparatus for providing location-related charging information to a charging system associated with an IP Multimedia Subsystem, IMS, network, where the location-related charging information relates to a session or session initiation or an event involving at least two users. The apparatus comprises processor circuitry and a storage unit for storing instructions executable by the processor circuitry, whereby the apparatus is operative to, at a Charging Trigger Function, CTF, within the IMS network, receive a Session Initiation Protocol, SIP, message from each of said users, each message containing a SIP header identifying a location of the sending user. The apparatus is further operative to add location information of each user to a charging message sent from the CTF to said charging system, location being, or being derived from, the content of the SIP header received from the user or being derived from that SIP header.

According to a third aspect of the present invention there is provided a Call/Session Control Function, Application Server, Gateway Control Function, or Multimedia Resource Function Controller comprising the apparatus of the above second aspect of the invention.

According to a fourth aspect of the present invention there is provided a method of obtaining location-related charging information at a charging system associated with an IP Multimedia Subsystem, IMS, network, where the location-related charging information relates to a session or session initiation or an event involving at least two users. The method comprises, at the charging system, receiving from a Charging Trigger Function, CTF, within the IMS network, a charging message containing a location of each user. The location may be a contents of a P-Access-Network-Info, PANI, header.

According to an embodiment of the invention, the first of said users may be a user served by the IMS network and a second of said users is a remote user served by a further IMS network. In this case, the charging message may be in accordance with the Diameter protocol, the location of the served user being included within an Access-Network-Information (ANI) Attribute-Value-Pair (AVP) of the charging message, and the location of the remote user being included within a further AVP of the charging message.

The method may comprise using said location at the charging system to generate a charge to be applied to one or both of the users.

The charging message may include, for each location, an identity of the associated user, the method comprising using the identity within the charging system to allocate charges to the users.

The or each identity may be a SIP-Uniform Resource Identifier, SIP-URI or a Tel-Uniform Resource Identifier, Tel-URI.

DETAILED DESCRIPTION

Figure 1:
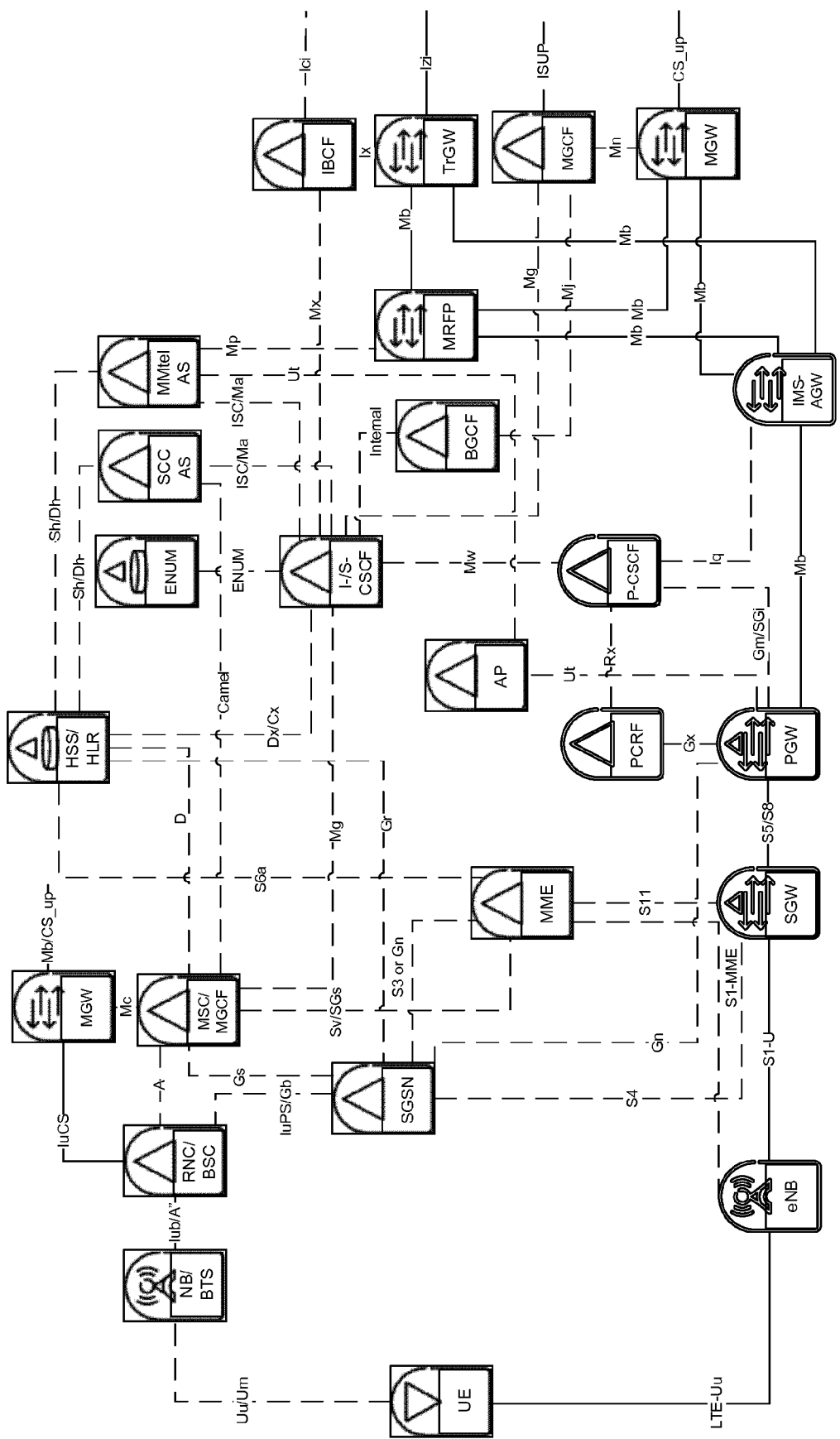
FIG. 1 illustrates schematically an IMS network integrated into an LTE access network.
Figure 2:
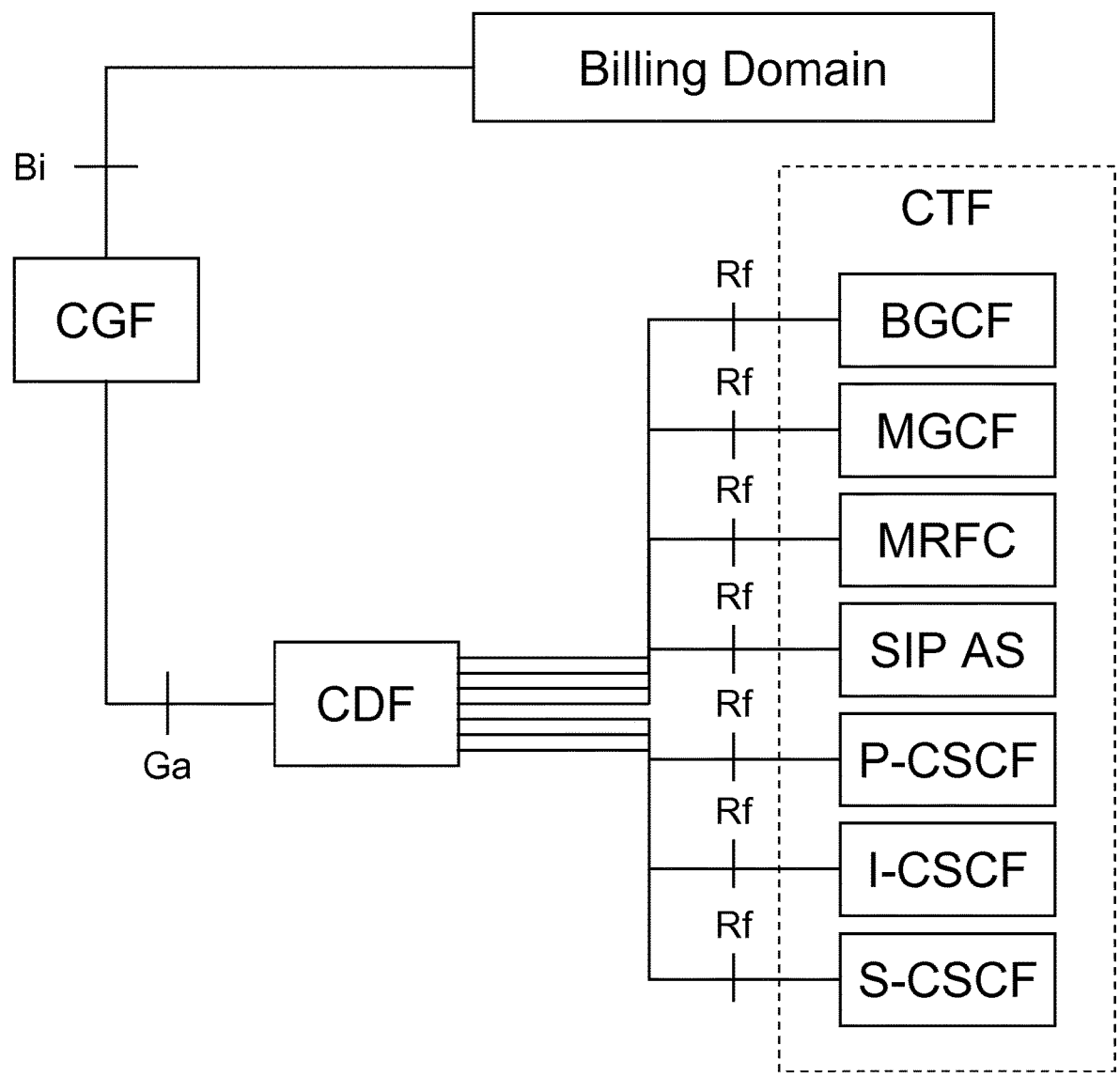
FIG. 2 illustrates schematically an IMS offline charging architecture.
Figure 3:
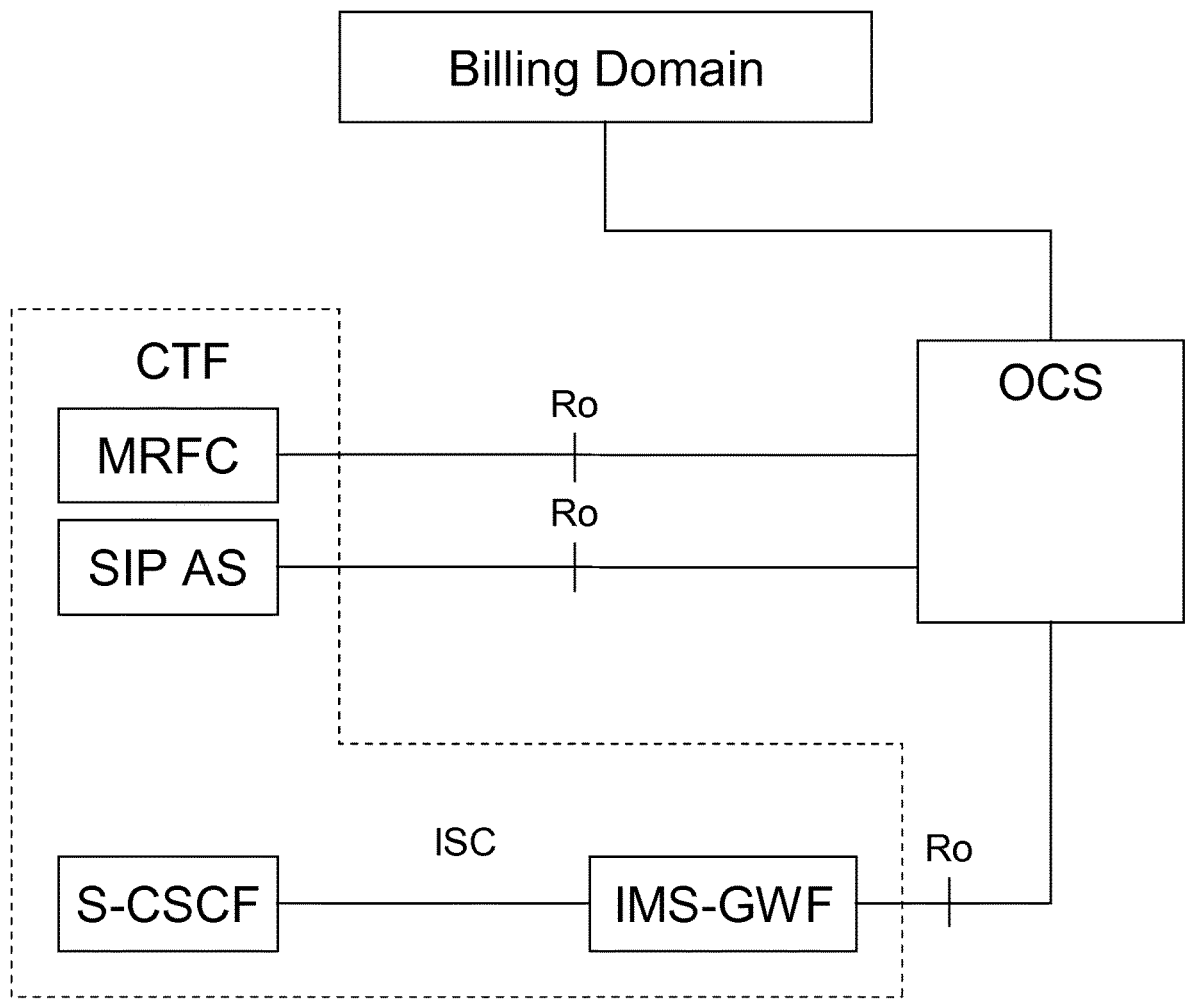
FIG. 3 illustrates schematically an IMS online charging architecture.
Figure 4:
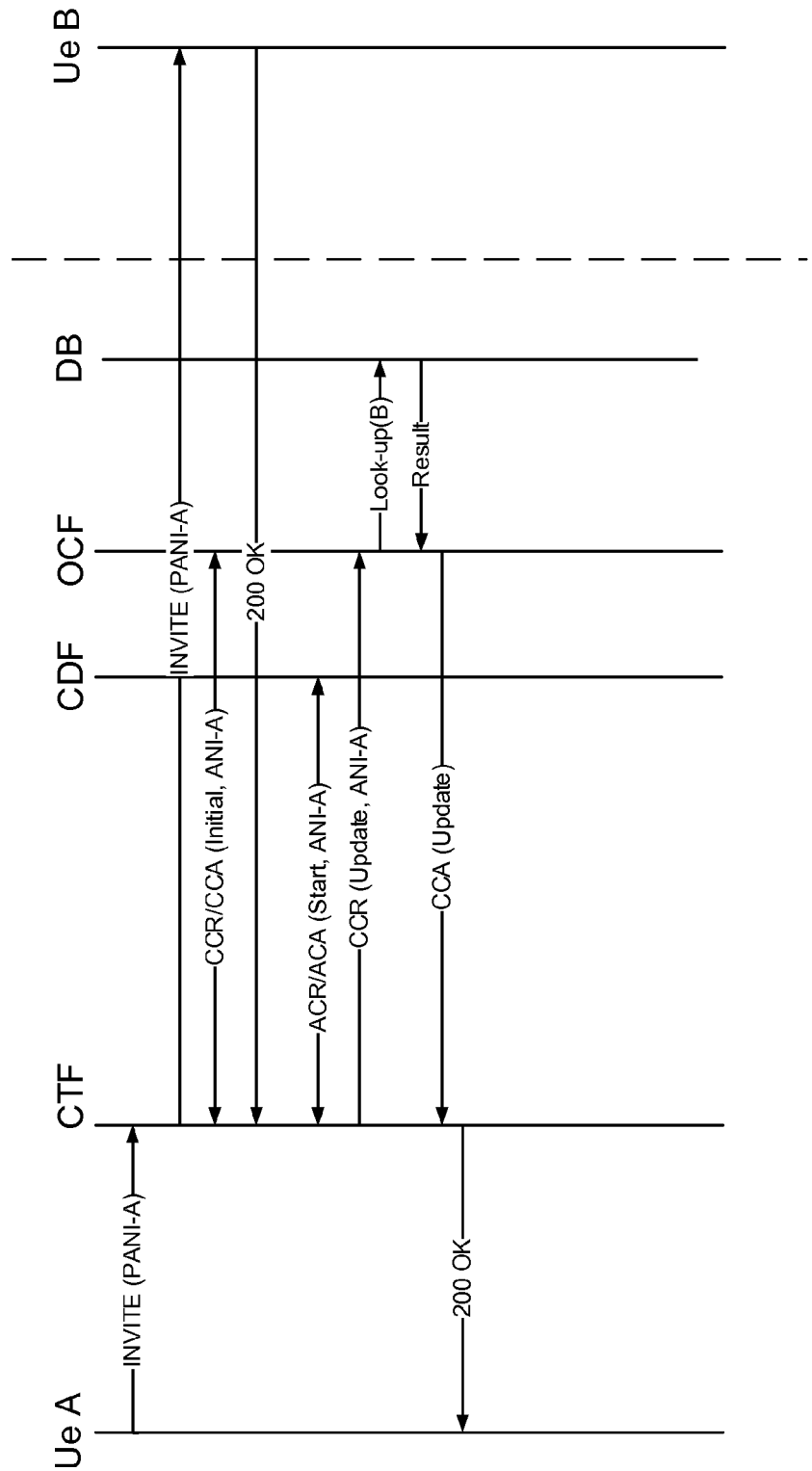
FIG. 4 illustrates signaling associated with a hypothetical solution to the problem of providing location related charging information to an OCF of an online charging system for both users involved in an IMS session.

An introduction to the IP Multimedia Subsystem (IMS) and to charging systems with the IMS has been presented above. In addition, a possible mechanism for providing location information to an IMS charging system in respect of both users (e.g. including a user that is not served by that IMS network) has been described with reference to FIG. 4.

Considering further IMS-SIP, the PANI header in a SIP message carries location information of the user sending the message. In a dialog, the originating user (A) as well as the terminating user (B) can trigger a request, which means the PANI header in a request can be related to user A or to user B. 3GPP TS 32.299 states that the Access-Network-Information AVP is populated with contents of the PANI header but it does not say whether this shall be done only for the served user or for both. Although the Access-Network-Information AVP can be reported multiple times in a charging message to the CDF/OCF, according to the current standards there is no way to indicate which user it relates to.

Consider a typical example of a SIP dialog where User A sends an INVITE towards user B, and where User A's home IMS network is responsible for generating charging information applicable to User A. The INVITE contains a PANI header with a location of user A. This location will typically be a globally recognizable identity (e.g. MCC, MNC) of the network in which user A resides. The 200 OK response from User B contains likewise a PANI header with the location of User B. Later on in the dialog, User B wants to switch to a high-definition audio codec and the terminal sends a reINVITE with, in addition to the new SDP information, a PANI header with the location of User B. The resulting response contains a PANI header with the location of User A.

Online charging is triggered by each message in the dialogue while offline charging is triggered mainly by completed transactions. When a charging message is triggered, the location of the involved parties is added. Today's 3GPP specification allows multiple instances of the Access-Network-Information (ANI) AVP but this is to be able to include user provided PANI headers as well as network provided PANI headers, i.e. related to one and the same user.

A mechanism is needed to report location from a CTF to the OCF or CDF, as well as to indicate to the OCF/CDF which user this location is applicable to. This can be solved in a number of different ways. One solution is to use the existing ANI AVP to convey the location of the served user (i.e. User A on originating side, and User B on terminating side), whilst a new AVP is used to convey the location of the remote user (i.e. User B on the originating side and User A on the terminating side).

As there may be services with multiple call legs, e.g. conference calls, the related charging session may also cover multiple call legs, which means that there is a need to tag the location that is provided for each user, in a charging message, with a user identifier. This could involve tagging the location with, for example, the SIP-uri of the user. When a SIP message is received by a CTF, it will store the location information together with the associated identity, i.e. the user sending the SIP message. This information is then added as charging data when a charging message is triggered and sent by the CTF to the OCF/CDF.

The charging information can be structured in different ways and one example is (according to the Diameter Base protocol RFC6733, chapter 4.2):

*Remote-User-Location-Information AVP
   *Remote-Access-Network-Information AVP
   Remote-Party-Address AVP Nb. "*" is used to indicate that the message may include more than one instance of the particular AVP.

The already existing Access-Network-Information AVP could also be reused instead of the Remote-Access-Network-Information AVP in the example above.

Figure 5:
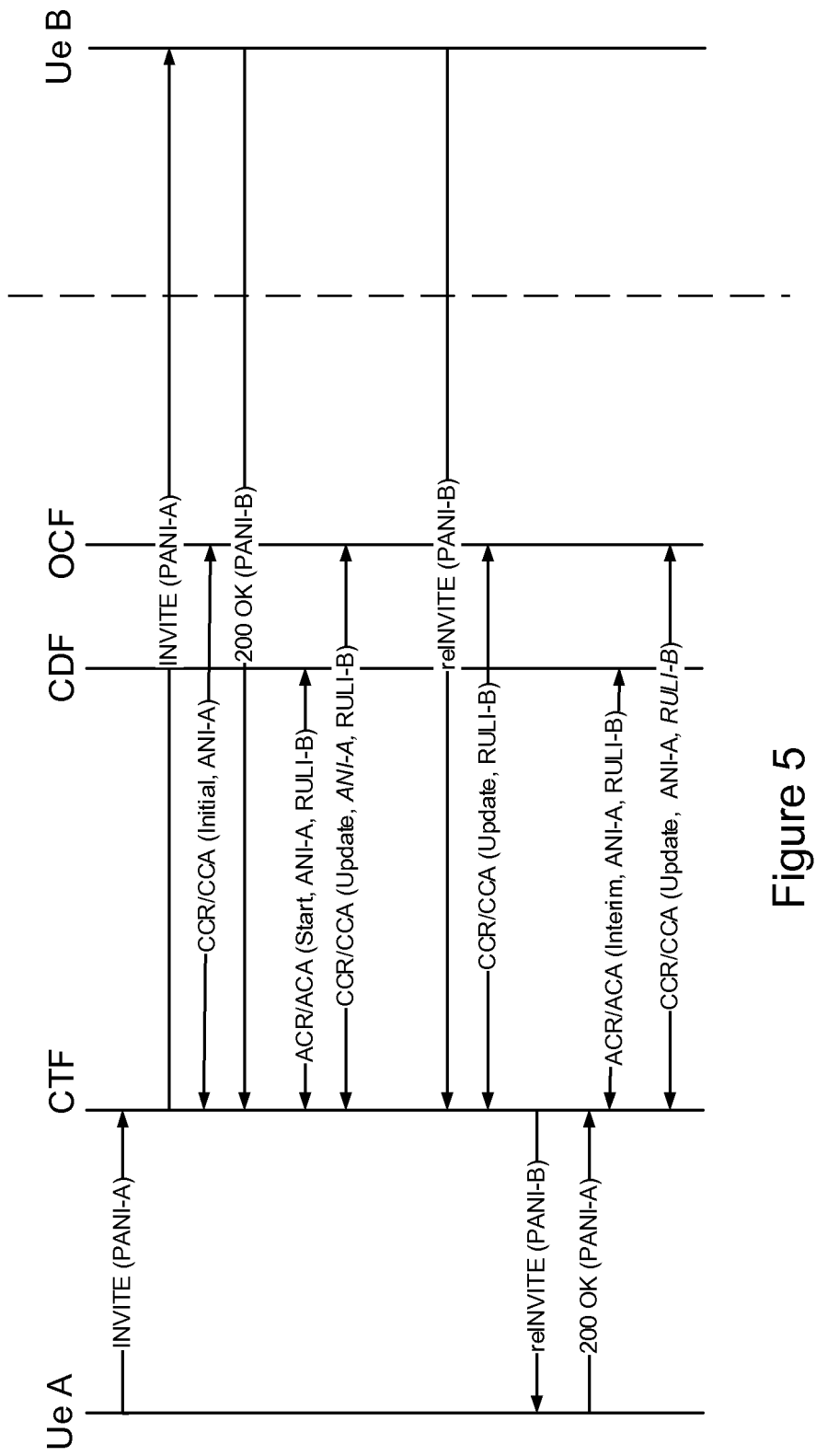
FIG. 5 illustrates signaling associated with providing location related charging information to a charging system, both for an offline and an online case.

FIG. 5 illustrates signaling associated with this approach, showing both the online (OCF) and offline (CDF) cases. For the online case, the CTF sends an initial charging message to the OCF following receipt of the INVITE from UeA. This is a standard Diameter charging message including the "normal" Access-Network-Information AVP (ANI-A) identifying the location of served user UeA. Following receipt of the 200 OK response from the non-served user, UeB, the CTF sends a further, update, Diameter charging message to the OCF. This message includes the Remote-User-Location-Information AVP (RULI-B) identifying the location of user UeB as well as the ANI-A sent previously. FIG. 5 further illustrates that UeB sends a reINVITE to UeB, e.g. to change the session parameters. Upon receipt of the reINVITE, the CTF sends an update charging message to the OCF including RULI-B. In the case of offline charging, a first, start, charging message is sent to the CDF following receipt by the CTF of the 200 OK response. Subsequently, receipt by the CTF of the reINVITE causes the CTF to send to the CDF an update charging message. Both messages contain the ANI-A and RULI-B.

As an alternative to using the Remote-Party-Address AVP, the existing Called-Party-Address and Calling-Party-Address AVPs may be used, resulting in different layouts on the originating and terminating sides. An example with re-use of Calling- and Called-Party-Address is for originating (calling) side information:

*Remote-User-Location-Information AVP
   *Remote-Access-Network-Information AVP
   Called-Party-Address AVP and for the terminating (called) side information:

*Remote-User-Location-Information AVP
   *Remote-Access-Network-Information AVP
   Calling-Party-Address AVP Location information provided for a user involved in an IMS service can also be used to create an additional type of location identification for the user. This additional type of location identification is referred to here as a "zone". A zone is a predefined area with specific geographic information. The concept of zones can be used to create a higher abstraction level which is stable over time. The mapping of the location information provided in the PANI (e.g. MCC-MNC and LAC/TAC and Cell-Id) to a zone can be done in a database, meaning that, for example, following a cell modification in a mobile network (e.g. change of Cell-Id) only the database needs to be updated and not all nodes that are using zone-based location information for services. The database can be co-located within the CTF (i.e. within the same network node) or can be located externally in another node.

The zone information for a user shall also be sent to CDF/OCF in a charging message (both items are desirable as the information in the PANI can be used for example to make a determination of roaming, and also includes TZ-info).

The proposed structure above for the remote user can be extended to include the zone information:

*Remote-User-Location-Information AVP
   Remote-Access-Network-Information AVP
   Remote-Party-Address AVP
   Zone-Information AVP The Zone-Information AVP is also included in the charging message for the served user.

Rather than including a separate Zone-Information AVP, the information could be added as a new parameter to the PANI header, thereby letting the Access-Network-Information AVP carry the information and also providing other nodes in the call chain with the same information. This would allow other nodes to make use of the zone-Information.

It will be appreciated that, with a zone-mapping based solution, the zone information can also be determined using sources other than the PANI header. For example, it would be possible to use Geolocation SIP headers of a received SIP message as defined in RFC6442 and in 3GPP TS 24.229.

Figure 6:
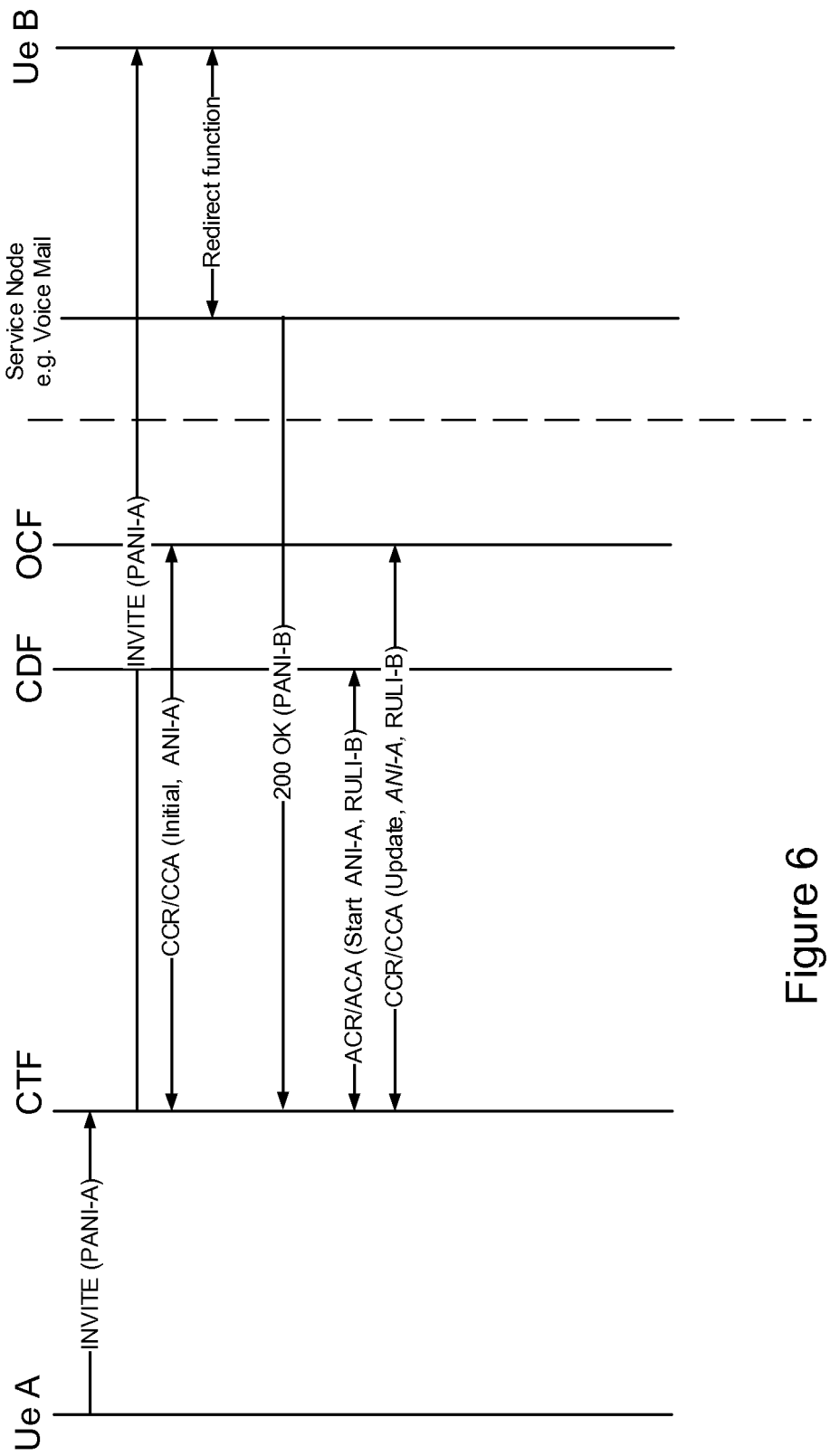
FIG. 6 illustrates signaling associated with providing location related charging information to a charging system, in the case of a session redirected from an end user UE to a voice mail server.

It will be appreciated by the person of skill in the art that various modifications may be made to the above described embodiments without departing from the scope of the present invention. For example, as already discussed briefly above, rather than being subscriber (UE), a "user" whose location and identity that are provided to the OCF/CDF may be in respect of a network node, for example a voice mail server. FIG. 6 illustrates signaling associated with a session initiated between a UeA and a UeB, wherein UeB redirects the session to a voicemail server in UeBs IMS network. Charging messages for both the online and offline charging cases are shown.

Figure 7:
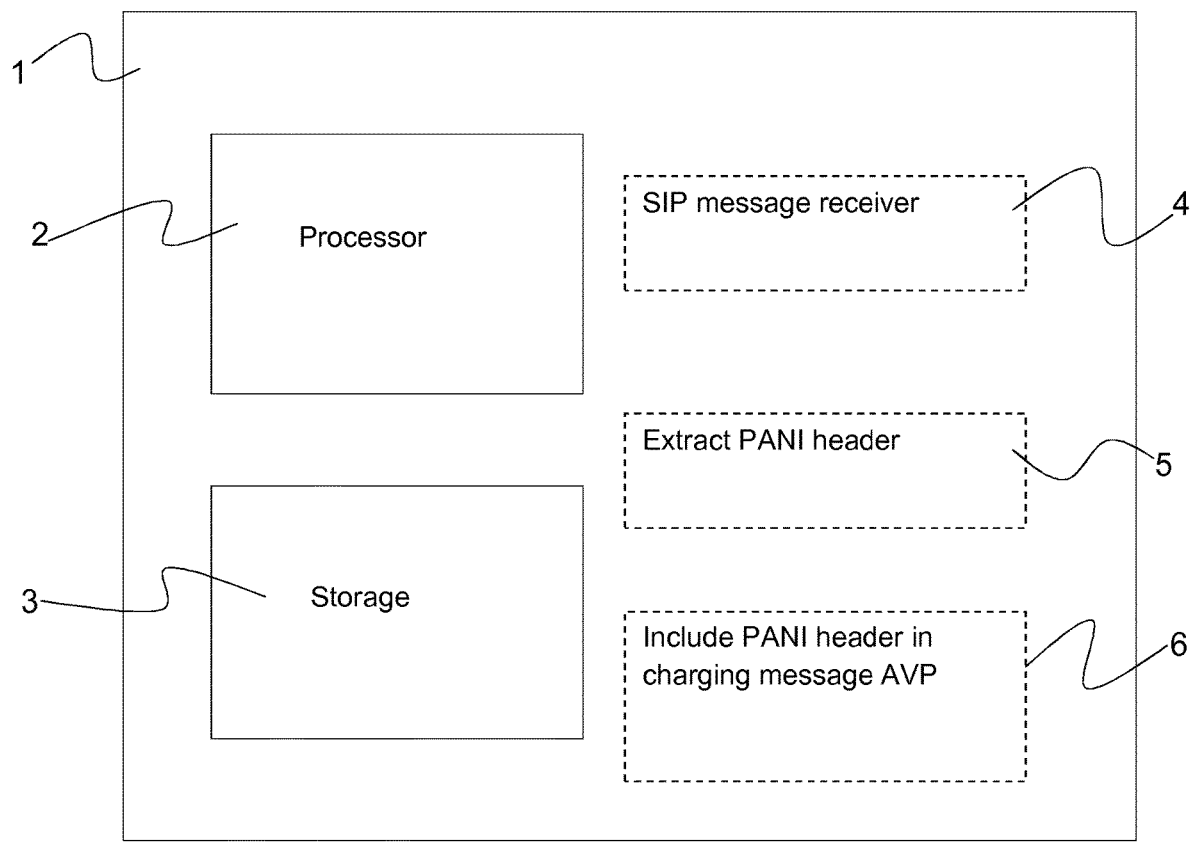
FIG. 7 illustrates schematically an IMS node with CTF function.

FIG. 7 illustrates schematically an IMS network node 1, such as a CSCF, SIP AS, MRFC, etc, within which a CTF is provided. The node includes processing circuitry 2 and storage circuitry 3. Code and other data is held in the storage circuitry and, when executed, implements functionality required to collect and send location information to one of an online charging system and an offline charging system. More particularly this functionality includes a SIP message receiver function 4 that is responsible for receiving and handling SIP messages that contain a PANI header identifying a location of a message sender. A PANI header extraction function 5 is provided to extract PANI headers and pass these to a function 6 that stores the headers and incorporates them as required into charging messages to be sent to a CDF or OCF.

Figure 8:
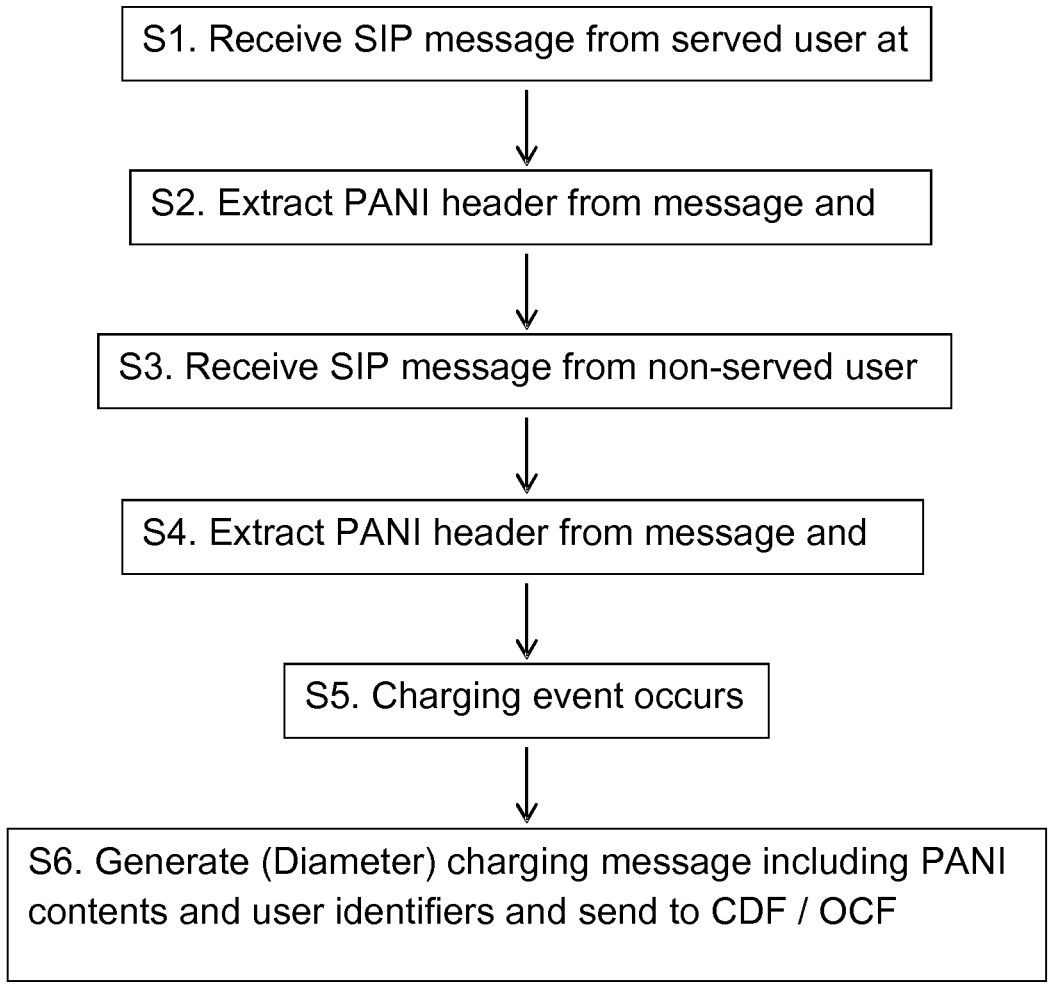
FIG. 8 is a flow diagram illustrating a method of providing location related charging information to a charging system.

FIG. 8 is a flow diagram illustrating a method that is implemented within the node of FIG. 7. The flow is merely exemplary of course and considers a case where SIP messages are received from the served and non-served users (S1, S3), location information extracted from respective PANI headers (S2, S4) and, following a charging event (S5), a single charging message sent to the charging system (CDF/OCF) containing both locations.

The invention claimed is:

1. A method of providing location-related charging information to a charging system associated with an IP Multimedia Subsystem (IMS) network, the method comprising:
   at a Charging Trigger Function (CTF) within the IMS network, receiving a first Session Initiation Protocol (SIP) message transmitted by a first user, wherein the first SIP message comprises a SIP header containing first location information identifying a location of the first user; and
   at the CTF, receiving a second SIP message transmitted by a second user, wherein the second SIP message comprises a SIP header containing second location information identifying a location of the second user;
the CTF determining that the second SIP message responds to the first SIP message;
the CTF generating a charging message as a result of determining that the second SIP message responds to the first SIP message, wherein the charging message comprises: i) the first location information or information derived from the first location information and ii) the second location information or information derived from the second location information; and
the CTF transmitting to the charging system the generated charging message that comprises i) the first location information or information derived from the first location information and ii) the second location information or information derived from the second location information.

2. The method of claim 1, further comprising:
the CTF generating a second charging message following receipt of the first SIP message, wherein the second charging message comprises the first location information or information derived from the first location information; and
the CTF transmitting to the charging system the second charging message.

3. The method of claim 1, wherein the first user is a user served by the IMS network and the second user is a remote user served by a further IMS network.

4. The method of claim 3, wherein said charging message is sent in accordance with a Diameter protocol, the location of the first user being included within an Access-Network-Information (ANI) Attribute-Value-Pair (AVP) of the charging message, and the location of the second user being included within a further AVP of the charging message.

5. The method of claim 1, wherein the first SIP message is a SIP Invite message and the second SIP message is a SIP OK message responding to the SIP Invite message.

6. The method of claim 1, wherein
said charging message comprises:
a first record that contains i) the first location information or information derived from the first location information and ii) a first user identity (ID) identifying the first user; and
a second record that contains i) the second location information or information derived from the second location information and ii) a second user ID identifying the second user.

7. The method of claim 6, wherein each of the first user ID and the second user ID is a SIP-Uniform Resource Identifier or a Tel-Uniform Resource Identifier.

8. The method of claim 1, wherein said charging system is either an online charging system or an offline charging system.

9. The method of claim 7, wherein said charging system is an offline charging system and said charging message is sent from the CTF to a Charging Data Function of the offline charging system, via an Rf interface.

10. The method of claim 7, wherein said charging system is an online charging system and said charging message is sent from the CTF to an Online Charging Function of the online charging system, via an Ro interface.

11. The method of claim 1, wherein
the location of the first user and/or the location of the second user is derived from a SIP header including the first location information and/or the second location information, and a step of deriving the location of the first user and/or the location of the second user comprises performing a lookup to map a content of the SIP header including the first location information and/or the second location information to a geographical zone.

12. The method of claim 11, wherein said lookup is performed using a database co-located with the CTF or remotely accessed by the CTF.

13. An apparatus for providing location-related charging information to a charging system associated with an IP Multimedia Subsystem (IMS) network, the apparatus comprising processor circuitry and a storage unit for storing instructions executable by the processor circuitry, whereby the apparatus is operative to:
receive a first Session Initiation Protocol (SIP) message transmitted by a first user, wherein the first SIP message comprises a SIP header containing first location information identifying a location of the first user; and
receive a second SIP message transmitted by a second user, wherein the second SIP message comprises a SIP header containing second location information identifying a location of the second user;
determine that the second SIP message responds to the first SIP message;
generate a charging message as a result of determining that the second SIP message responds to the first SIP message, wherein the charging message comprises: i) the first location information or information derived from the first location information and ii) the second location information or information derived from the second location information; and
transmit to the charging system the generated charging message that comprises i) the first location information or information derived from the first location information and ii) the second location information or information derived from the second location information.

14. A Call/Session Control Function, Application Server, Gateway Control Function, or Multimedia Resource Function Controller comprising the apparatus of claim 13.

15. A method of obtaining location-related charging information at a charging system associated with an IP Multimedia Subsystem (IMS) network, wherein the location-related charging information relates to a session, session initiation, or an event involving a first user and a second user, the method comprising:
at the charging system, receiving from a Charging Trigger Function (CTF) within the IMS network a first charging message comprising first location information identifying a location of the first user;
at the charging system, receiving from the CTF within the IMS network, a second charging message comprising: i) the first location information identifying the location of the first user and ii) second location information identifying a location of the second user communicating with the first user;
the charging system determining a tariff based on the first location information and the second location information; and
the charging system generating a charge based on the determined tariff, wherein
the CTF sent toward the charging system the first charging message after receiving an invitation message sent from the first user, and
the CTF sent toward the charging system the second charging message after receiving a response message sent from the second user.

16. The method of claim 15, wherein each of the first location information and the second location information is a content of a P-Access-Network-Info header.

17. The method of claim 15, wherein the first user is a user served by the IMS network and the second user is a remote user served by a further IMS network.

18. The method of claim 17, wherein
the second charging message is in accordance with the Diameter protocol,
the location of the user served by the IMS network is included within an Access-Network-Information (ANI) Attribute-Value-Pair (AVP) of the second charging message, and
the location of the remote user is included within a further AVP of the second charging message.

19. The method of claim 15, wherein the second charging message includes, for each location, an identity of an associated user, and the method further comprises using the identity of the associated user within the charging system to allocate a charge to the associated user.

20. The method of claim 19, wherein the identity of the associated user is a SIP-Uniform Resource Identifier (SIP-URI) or a Tel-Uniform Resource Identifier (Tel-URI).

* * * * *